Nov. 15, 1966  M. L. HENDERSON  3,285,986
SEPARATION PROCESS
Filed March 12, 1962
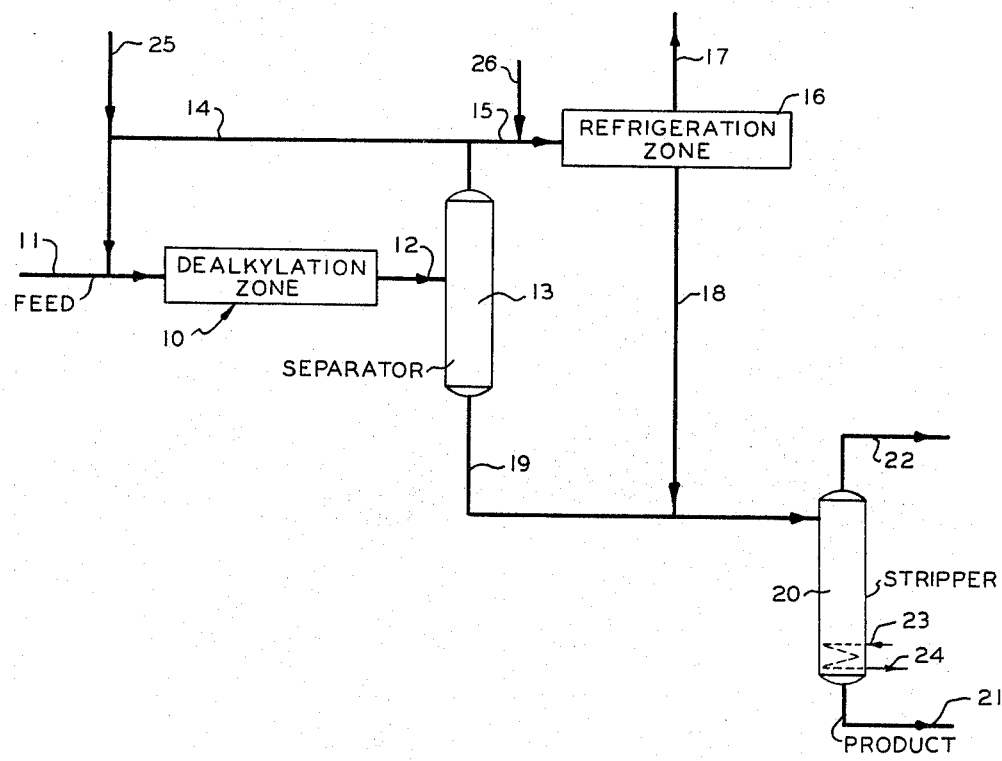
INVENTOR.
M. L. HENDERSON
BY Young + Quigg
ATTORNEYS

United States Patent Office 3,285,986
Patented Nov. 15, 1966

3,285,986
SEPARATION PROCESS
Miles L. Henderson, Bartlesville, Okla., assignor to Phillips Petroleum Company, a corporation of Delaware
Filed Mar. 12, 1962, Ser. No. 179,003
9 Claims. (Cl. 260—674)

This invention relates to an improved separation process and apparatus therefor. In one specific aspect, this invention relates to an improved vapor-liquid separation process. In another specific aspect, this invention relates to an improved process for the separation of a dealkylation zone effluent.

Conventionally, in the separation of a vapor-liquid mixture, the mixture is passed to a phase separation zone. A vaporous product stream is withdrawn from the upper region of the phase separation zone and a liquid product stream is withdrawn from the lower region of the phase separation zone. This method of separating vapor-liquid mixtures is ineffective when applied, for example, to the separation of a dealkylation zone effluent.

In the production of benzene, an alkylaromatic hydrocarbon feed stream is passed to a thermal hydrodealkylation zone wherein the alkylaromatics are converted to produce benzene. The effluent from the dealkylation zone comprising hydrogen, methane, ethane, benzene and alkylbenzenes is passed to a phase separation zone. A vaporous stream comprising hydrogen, methane, ethane, benzene and alkylbenzenes is withdrawn from the phase separation zone. A liquid stream comprising methane, ethane, benzene and alkylbenzenes is withdrawn from the phase separation zone. The liquid stream is fractionated in a first fractionation zone to produce an overhead methane and ethane, and a benzene and alkylbenzene product stream which is further fractionated to separate the benzene and alkylbenzenes. In operation of the first named fractionation zone, at least a portion of the overhead methane and ethane stream is cooled and recycled as reflux to the fractionation zone.

A disadvantage of the conventional separation process is that the benzene and the vaporous stream being withdrawn from the phase separation zone reduces the total quantity of benzene recoverable from the dealkylation process. This is a disadvantage of other conventional vapor-liquid separation processes employing a phase separation zone as there is a general tendency (varying as to different feed mixtures) for a portion of the normally liquid phase to pass from the phase separation zone with the vaporous stream and a tendency for a portion of the normally vaporous phase to pass from the phase separation zone with the liquid stream.

A further disadvantage of the conventional separation process as applied to the production of benzene is the excessive cooling required of the first fractionation zone reflux methane and ethane stream.

I have discovered an improved separation process wherein a vapor-liquid mixture is passed to a phase separation zone; a vaporous phase is withdrawn from the phase separation zone and passed to a refrigeration zone; a liquid phase is withdrawn from the phase separation zone and passed to the upper region of a stripping zone; a vaporous phase is withdrawn from the refrigeration zone; a liquid phase is withdrawn from the refrigeration zone and combined with the liquid phase passed to the stripping zone; a vaporous stream is withdrawn from the stripping zone; and a liquid product stream is withdrawn from the stripping zone.

Accordingly, an object of my invention is to provide an improved separation process and apparatus therefor.

Another object of my invention is to provide an improved vapor-liquid separation process and apparatus therefor.

Another object of my invention is to provide an improved process for the recovery of benzene from the effluent of a dealkylation zone.

Other objects, advantages, and features of my invention will be readily apparent to those skilled in the art from the following description and the appended claims.

The inventive separation process will hereinafter be described as applied specifically to the separation and recovery of benzene from the effluent of a dealkylation zone. It is not intended that the invention be limited thereto as the principles herein disclosed are readily adaptable to other vapor-liquid separation processes.

The drawing is a schematic representation of the inventive process as applied to the recovery of a benzene product stream from a dealkylation zone effluent.

Referring to the drawing, a liquid hydrocarbon feed stream comprising alkylbenzenes is passed via conduit means 11 to thermal dealkylation zone 10. In the thermal dealkylation of alkylbenzenes to produce benzene, hydrogen is employed as a diluent and as such, is mixed with the hydrocarbon feed in conduit means 11 prior to passage of the feed mixture to the thermal dealkylation zone 10. The mol ratio of hydrogen to hydrocarbon feed is maintained at about 5:1. The temperature and pressure of dealkylation zone 10 is maintained in the range of about 1000–1400° F. and about 400–800 p.s.i.a., respectively. The hydrogen mixed with the feed in conduit means 11 normally contains hydrocarbons such as methane and ethane.

The effluent from dealkylation zone 10 comprising hydrogen, methane, ethane, benzene and alkylbenzenes is passed via conduit means 12 to separator 13. The temperature and pressure of separator 13 is about 120° F. and 500 p.s.i.a., respectively. A vaporous stream comprising hydrogen, methane, ethane, benzene and alkylbenzenes is withdrawn from separator 13 via conduit means 14. A portion of the vaporous stream is recycled via conduit means 14 and conduit means 11 to dealkylation zone 10, with makeup hydrogen added via conduit means 25. The remainder of the vaporous stream is passed via conduit means 15 to refrigeration zone 16. Although, as illustrated, only a portion of the vaporous stream is passed to the refrigeration zone, it is within the scope of this invention to pass all of the stream to the refrigeration zone in those cases wherein it is not desirous to bleed a portion of the vapor from the process. A liquid stream comprising methane, ethane, benzene and alkylbenzenes is withdrawn from separator 13 via conduit means 19 and passed to the upper region of stripper 20.

Refrigeration zone 16 is maintained at a temperature of about 20–60° F. and a pressure of about 200–400 p.s.i.a. so as to condense the benzene and alkyl-benzenes passed to refrigeration zone 16 via conduit means 15. A vaporous stream comprising hydrogen, methane and ethane is withdrawn from refrigeration zone 16 via conduit means 17. The removal of methane and ethane from the dealkylation process via conduit means 17 prevents the build-up within the dealkylation zone of low boiling hydrocarbons. A liquid stream comprising benzene and alkylbenzenes is withdrawn from refrigeration zone 16 via conduit means 18 and combined with the liquid stream withdrawn from separator 13 in conduit means 19.

The addition of the cold benzene and alkylbenzenes stream from refrigeration zone 16 to the liquid stream from separator 13 reduces the temperature of the feed stream to stripper 20 to about 100° F. with the volume ratio of liquid flowing in conduit 18 to the liquid withdrawn from separator 13 about 1 to 5. The cold feed to stripper 20 serves as an effective reflux to the stripping process within stripper 20. A kettle temperature of about 447° F. is maintained in stripper 20 and the pressure in stripper 20 is about 300 p.s.i.a. A product stream comprising 99.7 volume percent of the benzene passed to stripper 20 and alkylbenzenes is withdrawn from stripper 20 via conduit means 21. An overhead vaporous stream comprising methane, ethane and about 0.3 volume percent of the benbzene passed to stripper 20 is withdrawn from stripper 20 via conduit means 22. It is within the scope of this invention to recycle the vaporous stream withdrawn from stripper 20 to refrigeration zone 16, thereby recovering the benzene passing overhead from stripper 20.

The separation of benzene from the alkylbenzenes withdrawn from stripper 20 via conduit means 21 can be effectively obtained by passing the product stream to a fractionation zone and recovering a benzene stream from said fractionation zone.

Refrigeration zone 16 is operated at a temperature of 40° F. and at a pressure of 200 p.s.i.a. A vaporous stream having the composition illustrated in Table II is withdrawn from refrigeration zone 16 via conduit means 17. A liquid stream having the composition illustrated in Table II is withdrawn from refrigeration zone 16 via conduit means 18. The liquid stream flowing in conduit 18 is combined with the liquid stream flowing in conduit 19 of Example I to provide a combined feed stream to stripper 20 having the composition illustrated in Table II. The temperature of the feed stream passed to stripper 20 is 100° F. A kettle temperature 447° F. is maintained in stripper 20 and the pressure in stripper 20 is maintained at 300 p.s.i.a. The composition of the product streams withdrawn from stripper 20 via conduit means 21 and 22 is as illustrated in Table II.

TABLE II

| Composition | Conduit 17 (moles) | Conduit 18 (moles) | Conduit 19 (moles) | Conduit 22 (moles) | Conduit 21 (moles) |
|---|---|---|---|---|---|
| Hydrogen | 11.74 | | .06 | .06 | |
| Methane | 22.45 | | .45 | .45 | |
| Ethane | 2.07 | .09 | .33 | .42 | |
| Benzene | .04 | .57 | 7.82 | .02 | 8.37 |
| Toluene | | 1.22 | .85 | | 2.07 |
| Xylenes | | | .10 | | .10 |
| Biphenyls | | | .20 | | .20 |

It is within the scope of this invention, although not limited thereto, to admix with the feed to refrigeration zone 16 a heavier alkylbenzene such as toluene via conduit means 26. By so doing, the required condensing temperature within refrigeration zone 16 is elevated, thereby reducing the condensing capacity required. The alkyl benzene so added is withdrawn from refrigeration zone 16 via conduit means 18 passed to stripper 20. From stripper 20 the added alkylbenzene is withdrawn via conduit means 21 and separated as heretofore disclosed from the product benzene in a subsequent fractionation zone.

The following example is presented as illustrative of a conventional separation of the dealkylation zone effluent in separator 13.

*Example I*

100 moles of an alkylation effluent stream having the composition illustrated in Table I is passed via conduit means 12 to separator 13. Separator 13 is maintained at a temperature of 120° F. and at a pressure of 500 p.s.i.a. The composition of the product stream withdrawn from separator 13 via conduit means 14 and 19 is also illustrated in Table I.

TABLE I

| Composition | Conduit 12 (moles) | Conduit 14 (moles) | Conduit 19 (moles) |
|---|---|---|---|
| Hydrogen | 28.7 | 28.64 | .06 |
| Methane | 55.2 | 54.75 | .45 |
| Ethane | 5.6 | 5.27 | .33 |
| Benzene | 9.3 | 1.48 | 7.82 |
| Toluene | .9 | .05 | .85 |
| Xylenes | .1 | | .10 |
| Biphenyls | .2 | | .20 |

From the data of Table I, it is observed that 16 percent of the desired benzene product passed to separator 13 is withdrawn as a vapor from separator 13 via conduit means 14.

The effectiveness of the inventive process is demonstrated by the following example.

*Example II*

A feed stream having the composition of the stream flowing in conduit 14 of Example I is passed via conduit means 15 to refrigeration zone 16. 1.2 moles of toluene is passed via conduit means 26 to refrigeration zone 16. 99.7 volume percent of the benzene passed to stripper 20 is recovered from stripper 20 via conduit means 21. This clearly demonstrates the effectiveness of the inventive separation process. The effective separation of the benzene from the dealkylation zone effluent stream has been accomplished without the employment of a conventional stripper reflux stream.

As will be evident to those skilled in the art, various modifications of this invention can be made, or followed, in the light of the foregoing disclosure and discussion without departing from the spirit or scope thereof.

I claim:
1. A dealkylation zone effluent separation process which comprises passing a dealkylation zone effluent from a dealkylation zone to a separation zone, withdrawing from said separation zone a vaporous stream, recycling a portion of said vaporous stream to said dealkylation zone, passing the remainder of said vaporous stream to a refrigeration zone, withdrawing from said separation zone a liquid stream, withdrawing from said refrigeration zone a vaporous stream, withdrawing from said refrigeration zone a liquid stream, combining said liquid streams withdrawn from said separation zone and said refrigeration zone, passing said combined liquid stream to the upper region of a stripping zone, withdrawing from said stripping zone a vaporous stream, and withdrawing from said stripping zone a liquid product stream.

2. The separation process of claim 1 to include recycling the vaporous stream withdrawn from said stripping zone to said refrigeration zone.

3. A dealkylation zone effluent separation process which comprises passing a dealkylation zone effluent from a dealkylation zone to a separation zone, passing a vaporous stream from said separation zone to a refrigeration zone, withdrawing from said separation zone a liquid stream, withdrawing from said refrigeration zone a vaporous stream, withdrawing from said refrigeration zone a liquid stream, combining said liquid streams withdrawn from said refrigeration and separation zones, passing said combined liquid stream to the upper region of a stripping zone, withdrawing from said stripping zone a vaporous stream, and withdrawing from said stripping zone a liquid product stream.

4. The process of claim 3 to include recycling said vaporous stream withdrawn from said stripping zone to said refrigeration zone.

5. A dealkylation zone effluent separation process which comprises passing a dealkylation zone effluent stream from a dealkylation zone to a separation zone, said effluent stream comprising hydrogen, methane, ethane, benzene, toluene, and heavier alkylbenzenes, withdrawing from said separation zone a vaporous stream, passing at least a portion of said vaporous stream to a refrigeration zone, withdrawing from said separation zone a liquid stream, withdrawing from said refrigeration zone a vaporous stream, withdrawing from said refrigeration zone a liquid stream, combining said liquid streams withdrawn from said refrigeration and separation zones, passing said combined liquid stream to the upper region of a stripping zone, withdrawing from the upper region of said stripping zone a vaporous stream, and withdrawing from said stripping zone a liquid benzene product stream.

6. The process of claim 5 to include passing to said refrigeration zone liquid toluene.

7. The process of claim 5 to include recycling the remainder of said vaporous stream withdrawn from said separation zone to said dealkylation zone.

8. The process of claim 5 to include recycling said vaporous stream withdrawn from said stripping zone to said refrigeration zone.

9. A dealkylation zone effluent process according to claim 5 wherein said dealkylation zone is maintained at a temperature of about 1000–1400° F. and at a pressure of about 400–800 p.s.i.a., said separation zone is maintained at a temperature of about 120° F. and a pressure of about 500 p.s.i.a., said refrigeration zone is maintained at a temperature in the range of 20–60° F. and at a pressure of about 200–400 p.s.i.a., said upper region of said stripping zone is maintained at a temperature of about 100° F., said combined liquid stream is maintained at about 100° F., said stripping zone kettle temperature is maintained at about 450° F. and the pressure in said stripping zone is about 300 p.s.i.a.

References Cited by the Examiner

UNITED STATES PATENTS

| | | | |
|---|---|---|---|
| 2,368,497 | 1/1945 | Shipley et al. | 260—674 X |
| 2,803,686 | 8/1957 | Stein | 260—674 |
| 2,943,041 | 6/1960 | Johnston et al. | 208—105 |
| 2,951,886 | 9/1960 | Paulsen | 260—674 |
| 2,998,457 | 8/1961 | Paulsen | 260—672 X |
| 3,188,359 | 6/1965 | Lempert et al. | 260—672 |

DELBERT E. GANTZ, *Primary Examiner.*

ALPHONSO D. SULLIVAN, *Examiner.*

C. E. SPRESSER, *Assistant Examiner.*